United States Patent Office 2,801,576
Patented Aug. 6, 1957

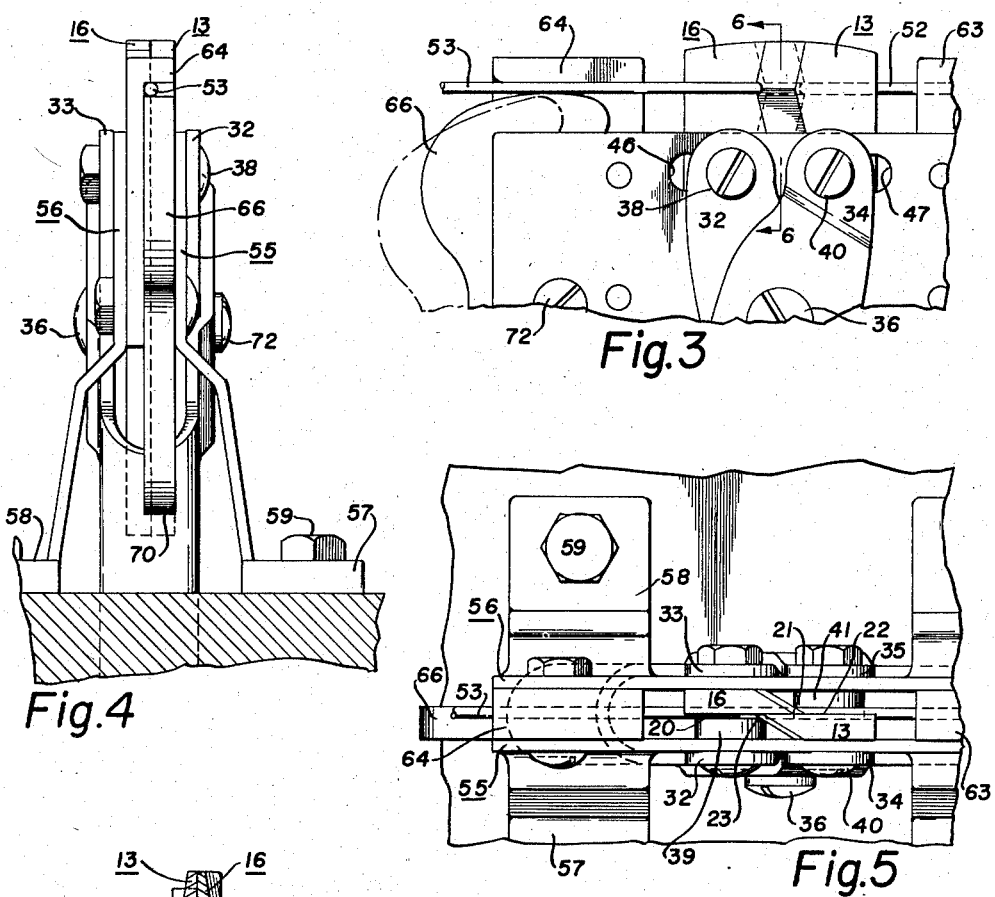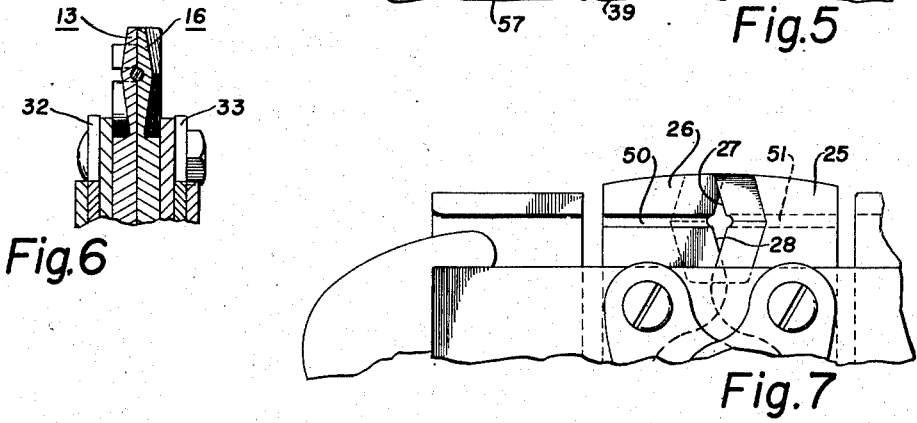

2,801,576

SURFACE TRIMMING AND FLANGE STRIPPING TOOL

William A. Barnes, Utica, N. Y., assignor to Utica Drop Forge & Tool Corporation, a corporation of New York Application June 2, 1953, Serial No. 359,160

16 Claims. (Cl. 90—24)

This invention relates to trimming and forming tools in general, and relates more particularly to a tool for trimming a flash located intermediate the ends of an elongated rod, bar, wire, and similar workpieces, such for example as the flash produced by butt welding of the ends of two wires by a solid phase bond under high pressure and confined flow at a temperature less than normal welding temperature.

It has been found that metal can be welded at a temperature substantially lower than the normal heat welding temperatures generally employed. In fact, some non-ferrous metals can be joined at room temperature with only the heat produced by the flow of metal in the union. The union must be produced under particular conditions of confined flow and high temperature after a careful preparation of the surface of the metal in the area to be joined. For teaching of these conditions, reference is made to Sowter Patent No. 2,522,408. Application Serial No. 343,745, and its continuation-in-part, Serial No. 347,583 illustrates specific tooling and applications of the basic principle to produce a union of elongated members such for example as wire, rods, bars, and tubing. The production of a successful butt weld at room temperature results in a considerable lateral flow of the metal into a radial flange around the joint. Workpieces joined in this manner have been tested for tensile strength and often found to be stronger in the union than the original material. Removal of the flange sometimes reduces the tensile strength of the union but often makes very little difference. In fact, it has been found that wire and rods after having been welded and the flash removed, can be drawn further by passing the united members through conventional drawing dies. The union is usually lost in this drawing process and cannot be detected by polishing and etching, or at least is only faintly visible. The united members virtually become one.

However, in order to draw the united members, and often for other uses, the flange must first be clearly removed to produce a union similar in all respects to the balance of the original members.

An object of this invention is to provide a tool for removing flanges and protrusions from a workpiece.

Another object of this invention is to provide a tool for removing a radial flange located intermediate the ends of a long workpiece.

Still another object of this invention is to provide a flange stripping tool having cutter blades movable in adjacent planes relative to one another and passing in close proximity to produce a shear action.

Yet another object of this invention is to provide workpiece holding means for such a stripper tool to hold the workpiece relatively fixed with respect to the passing blades.

And another object of this invention is to provide recesses in the active surfaces of mating passing shear blades to hold a workpiece and permit the blades to pass along the surface of the workpiece for removing any undesired protrusion extending from the workpiece.

Other objects and a fuller understanding of the invention may be had by referring to the following description and claims, taken in conjunction with the accompanying drawings, in which:

Figure 3 is a fragmentary side elevational view of the tool with the blades closed and the flange removed;

Figure 4 is an end view of the tool of Figure 2;

Figure 5 is a top view of the tool as shown in Figure 3;

Figure 6 is a sectional view taken along line 6—6 of Figure 3; and

Figure 7 is a fragmentary elevational view of a tool illustrating an alternative type of cutter blade form.

Figure 1:
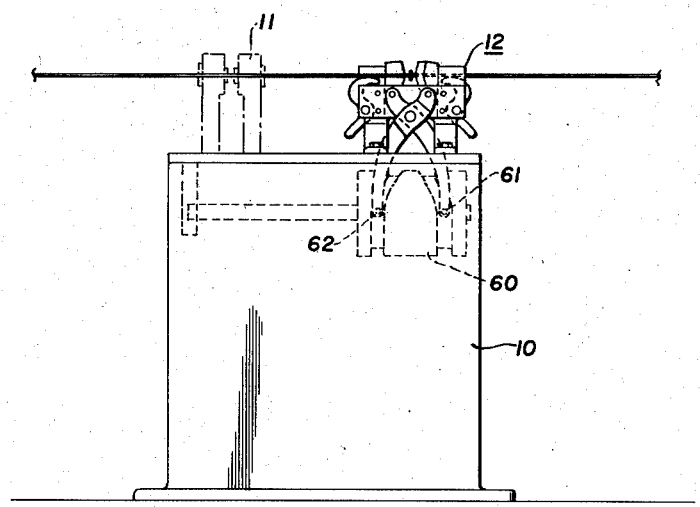
Figure 1 is a schematic view of a structure including a flange-producing butt welder, and the stripper tool of this invention, co-operating to unite a series of short wire sections into a continuus unitary wire without a flange.

Figure 1 is provided to illustrate a schematic arrangement of a production unit 10 embodying a butt welder 11 and a trimming tool 12 made according to the principles of this invention. The butt welder 11 is not intended to represent any particular type of welding unit. A specific room temperature butt welding tool is illustrated in application Serial No. 348,069. The trimming tool, or flash stripping tool, 12 is illustrated in greater detail in Figure 2 of the drawings. The particular embodiment of the invention illustrated in Figure 2 comprises a shear blade 13 having a work performing end 14 and a drive end 15. Another shear blade 16 is provided and also has a work performing end 17 and a drive end 18. Only two blades are normally required and, accordingly, all that are illustrated in this embodiment of the invention.

Figure 2:
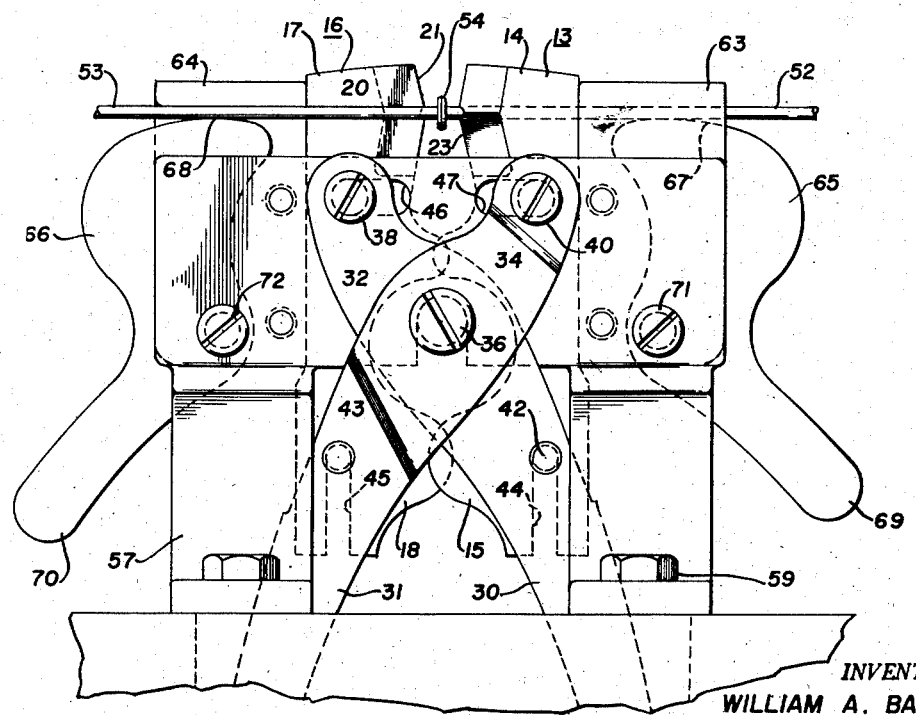
Figure 2 is a side elevational view of the flange stripper tool made according to the principles of this invention, with a butt welded wire clamped therein prior to shearing the flange from the united wire.

The shear blades are designed to pass one another in close proximity and, in fact, they should touch and slide along mating surfaces. In Figure 2 the blade 16 is illustrated as having a flat face surface 20 with a leading cutter edge 21. The blade 13 has a similar face surface 22 and cutter edge 23. The edge 23 appears in Figure 2 but the face surface of blade 13 may be seen only by reference to Figure 5.

The purpose of the trimming tool of this invention is to remove only protrusions from the surface of a workpiece without gouging the normal surfaces, and to leave the sheared metal as closely resembling the original workpiece as practical. Accordingly, the blades 13 and 16 are moved in such a direction that they will pass along the surface of the workpiece toward one another to pinch any protruding surface extending from the workpiece between the blades and shear the protrusion off as the blades pass one another.

It is to be understood that the illustrated embodiment provides for movement of both blades simultaneously. The blades can operate independently, if desired, that is, the workpiece may be held stationary by suitable holding means, and one blade may be advanced first to shear one-half of a flange. The blade may either be retracted, or allowed to remain in its advanced position, and the second blade thereafter advanced to shear away the remainder of the flange. Many modifications of the principle set forth herein will suggest themselves without further elaboration.

In the drawings, the invention is shown applied to the removal of a flash 54 from two joined wires 52 and 53. The original wires 52 and 53, and consequently the united wires, are straight members. Accordingly, movement of the blades 13 and 16 must follow straight line paths relative to one another.

In order that the blades 13 and 16 may pass along the surface of wires 52 and 53 without cutting into that surface, but having the cutting edge of the blades passing in close proximity to their surfaces, longitudinal recesses 50 and 51, as best shown in Figure 7 of the drawings, are provided in the blades 16 and 13 respectively. Recesses or grooves 50 and 51 are longitudinally aligned to accommodate the longitudinally aligned wires 52 and 53. If more than two blades are employed, the "recesses" will become merely workpiece contact surfaces. Nevertheless, the various recesses, or segments, when positioned around the longitudinal axis of the workpiece, will define a complete outline of the workpiece to trim all surfaces thereof, even though the blades are longitudinally spaced.

The blades 13 and 16 are moved in a reciprocable path coinciding with the aligned paths of recesses 50 and 51. Although many carriage drive means might be provided to produce such a reciprocable movement of the blades 13 and 16 in opposite directions along parallel straight line paths with respect to one another in a shear action, a mechanical drive movement is illustrated in the drawings. This mechanical drive means is illustrated in the form of levers 30 and 31. The lever 30 has two finger portions 32 and 33 whereas the lever 31 has two finger portions 34 and 35. The fingers 32 and 34 are pivotally joined and the fingers 33 and 35 are pivotally joined. Thus, the spaced fingers provide an internal space into which the blades 13 and 16 are cradled. A common pivot pin 36 passes through all of the fingers. It is conceivable that one of the levers could be provided on one side of the blades and another lever on the other side of the blades, but the illustrated embodiment employing double fingers on each lever has been found to be desirable. The ends of fingers 32 and 33 of lever 30 are joined to the shear blade 16 near the work performing end 17 by means of a pivot connector 38. The ends 34 and 35 of lever 31 are joined to the shear blade 13 near the work performing end 14 by means of a pivot connector 40.

The blades 13 and 16 are to pass in parallel paths beside one another with the faces 20 and 22 in contact and, therefore, the blades are laterally spaced in the cradle provided by the finger members of levers 30 and 31 by means of spacer blocks 39 and 41 as illustrated best in Figure 5 of the drawings.

In order to produce a rectilinear movement, the lever 30 is joined to the blade 13 by means of a pivot connector 42 extending through a slot 44 in the drive end 15 of blade 13. The lever 31 is connected to the shear blade 16 by means of a pivot connector 43 extending through a slot 45 in the drive end 18 of shear blade 16.

The pivots 38, 40, 42, and 43 are equally spaced from the pivot 36 and, consequently, pivotal closing of the handles 30 and 31 about the pivot 36 will cause a rectilinear closing movement of the blades 13 and 16. It must be understood that one of the blades 13 and 16 may be held stationary and the other blade moved relative thereto if desired.

Therefore, after wires 52 and 53 have been joined, the joined wires may be inserted into the tool by opening the blades 13 and 16 to a spaced relative position limit as illustrated in Figure 2, and the tool and united wires placed in a relative position wherein the flange 54 is between the blades 13 and 16 and the longitudinal axis of the wires crosses the longitudinal axis of the wire chamber defined by the combination of the recesses 50 and 51. Thereafter, either the tool or the united wire can be turned 90° to place the wire 53 into the recess 50 and the wire 52 into the recess 51. The wire is then placed into operative position within the tool as illustrated in Figure 2 of the drawings.

After the united wire is placed as described, the levers 30 and 31 may be closed to produce a passing shearing action of the blades 13 and 16. However, one-half of the flange 54 will give way before the other half and will be removed, whereupon the united wire will simply slip along with the other cutting surface without being removed.

In order to prevent the movement of the flange 54, or a portion thereof, along with one or the other of the shearing blades, a clamp device has been provided to insure a relative fixed position of the flange 54 with respect to the shearing action of blades 13 and 16. The illustrated embodiment of this clamp device comprises a side plate 55 and a side plate 56 mounted by mounting brackets 57 and 58 upon the base of the unit 10. Bolts 59 are illustrated as a convenient means for holding the mounting brackets. Slots 46 and 47 are provided to accommodate the pivot connectors 38 and 40 and to hold the shearing mechanism and the holding mechanism relatively fixed as an operative unit.

The illustrated clamp device is satisfactory for the purpose intended and is exceptionally easy to operate. The clamp has anvil portions 63 and 64 and finger actuated locking keys 65 and 66. Keys 65 and 66 have wedge surfaces 67 and 68 and release trigger portions 69 and 70. Pivots 71 and 72 pivotally carry the keys 65 and 66 on the side blades 55 and 56.

Now, therefore, after the wires 52 and 53 have been properly positioned in slots 50 and 51 as previously described, the operator may place finger pressure upon the keys 65 and 66 above the pivots 71 and 72 and cause the wedge area 67 and 68 to jam the wires against the anvil portions 63 and 64 thus binding the united wires against longitudinal movement. The tightness of the wedging action may be varied according to the degree of pressure applied upon the keys and the required resistance to longitudinal shifting will be dependent upon the hardness and toughness of the workpiece flange being sheared. If the workpiece begins to slip after one-half of the flange has been severed, the keys can be tightened slightly until the flange is sheared instead of the workpiece being moved.

The workpiece, after the flange has been removed, is released from the holding and clamping means by finger pressure upon the release triggers 69 and 70 and then the workpiece, in this instance the united wires 52 and 53, and the trimming tool 12 are rotated 90° with respect to one another and separated along the path in which they were joined.

The cutting edges of the shearing blades may be convex, as illustrated in Figure 2, but in many instances, a superior shearing action will take place with less clamping of the workpiece by the provision of concave shearing edges 27 and 28 as illustrated in Figure 7 of the drawings.

As previously stated, there are several possible means of providing the passing blade shear action required according to the teachings of this invention. The mechanical drive levers 30 and 31 may be power driven by any suitable means, such for example as by means of a drum cam 60 as illustrated in Figure 1 with suitable cam followers 61 and 62 on the ends of the levers 30 and 31. The levers 30 and 31 may also be closed by hand power if desired.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A workpiece surface trimming tool, comprising, first and second cutter blades, said blades each having a recess surface to receive a workpiece in nested relationship with the cutter blade, said blades longitudinally spaced in position to align said recesses to define a complete surface outline of said workpiece along a common axis, and means driving said blades along the surface of the workpiece in opposite directions.

2. A workpiece surface trimming tool, comprising, first and second cutter blades, said blades each having a recess surface to receive a workpiece in nested relationship with the cutter blade, said blades longitudinally spaced in position to align said recesses to define a complete surface outline of said workpiece along a common axis, means driving said blades along the surface of the workpiece in opposite directions, and workpiece gripping and holding means for holding a workpiece against movement along said axis.

3. A workpiece surface trimming tool, comprising, first and second cutter blades, said blades each having a recess surface to receive a workpiece in nested relationship with the cutter blade, said blades longitudinally spaced in position to align said recesses to define a complete surface outline of said workpiece along a common axis, means driving said blades along the surface of the workpiece in opposite directions, and workpiece gripping and holding means for holding a workpiece against movement along said axis, said holding means having a wedge-grip means that tightens the grip upon the workpiece as the longitudinal pull is increased.

4. A workpiece surface trimming tool, comprising, a plurality of cutter blades, said blades each having recessed workpiece contact surfaces to receive a workpiece in nested relationship with the cutter blade, said blades positioned to align said recessed surfaces to define a complete surface outline of said workpiece along a common axis, and means providing a relative longitudinal movement of the workpiece and cutter blades along said axis.

5. A workpiece surface trimming tool, comprising, first and second cutter blades, said blades each having a side groove to receive a workpiece in nested relationship with the cutter blade, said blades positioned to align said side grooves to define a complete surface outline of said workpiece along a common axis, and means providing a relative longitudinal movement of the workpiece and cutter blades along said axis.

6. A workpiece surface trimming tool, comprising first and second cutter blades, said blades each having recess surfaces to receive a workpiece in nested relationship with the cutter blade, said blades positioned to align said recesses to define a complete surface outline of said workpiece along a common axis, and means driving said blades in opposed directions along the surface of said workpiece, and means to hold the workpiece relatively fixed as the blades move along the surface thereof.

7. A flange stripper tool comprising, first and second shear blades, carriage means mounting said first and second shear blades for reciprocable movement in opposite directions with respect to one another in a shear action, between a spaced relative position limit and an overlapped relative position limit, a first workpiece receiving recess in the face of said first shear blade, a second workpiece receiving recess in the face of said second shear blade, said first and second recesses cooperating in said overlapped relative position to define a chamber having the form of a workpiece, and workpiece holding means providing a relative movement of a workpiece with respect to the shear blades.

8. A flange stripping tool, comprising, first and second shear blades, said first blade having a side face surface with a forward cutter edge, said second shear blade having a side face surface with a forward cutter edge, means driving said first and second cutter blades with a reciprocal movement along adjacent paths with said first and second cutter edges and side face surfaces passing in closely positioned relationship, workpiece relief surfaces recessed into the said first and second side face surfaces, said relief surfaces being aligned in the direction of said paths, and workpiece holding means providing longitudinal stability for a workpiece positioned in the recess of said blades.

9. A flange stripper tool comprising, first and second shear blades, said first shear blade having a side face surface with a forward cutter edge, said second shear blade having a side face surface with a forward cutter edge, carriage means mounting said first and second shear blades for reciprocable movement in opposite directions along parallel straight line paths with respect to one another in a shear action between a spaced relative position limit and an overlapped relative position limit, said side face surfaces of said cutter edges of the first and second shear blades passing in shearing relationship, a first workpiece receiving recess in the side face surface of said first shear blade, a second workpiece receiving recess in the side face surface of said second shear blade, said first and second recesses positioned to receive a work piece aligned with said straight line paths and cooperating in said overlapped position to define a chamber having the form of a workpiece, and workpiece clamp means holding a workpiece longitudinally fixed in said recesses, whereby a workpiece with a flange may be positioned in said recesses with the flange positioned between the blades in said spaced position limit and the blades closed to said overlapped position limit to shear the flange but pass over the remaining surface of the workpiece.

10. A workpiece surface trimming tool, comprising, first and second shear blades, each having mutually cooperating shear edges and sliding contact surfaces, means providing shear-action relative movement of the blades toward one another with the blades passing in sliding contact, and relief recesses in the contact surfaces to receive a workpiece, whereby the blades pass over the workpiece portion and shear off any protruding surfaces to be removed.

11. A workpiece surface trimming tool, comprising, first and second shear blades, said first shear blade having a longitudinal body with a work performing end and a drive end, said work producing end having a face surface with a forward cutter edge, said second shear blade having a longitudinal body with a work performing end and a drive end, said work producing end having a face surface with a forward cutter edge, carriage drive means mounting said first and second shear blades for reciprocable movement in opposite directions along parallel straight line paths with respect to one another in a shear action between a spaced relative position limit and an overlapped relative position limit, said carriage drive means having first and second crossed lever members, said first lever having a drive interconnection to the first shear blade adjacent the work producing end thereof, said first lever having a drive interconnection to the second shear blade a distance from the work producing end thereof, said second lever having a drive interconnection to the first shear blade adjacent the work producing end thereof, said second lever having a drive interconnection to the first shear blade a distance from the work producing end thereof, said drive interconnections being equally spaced from the crossing point of said levers, means pivoting each lever about said crossing point, said side face surfaces of said cutter edges of the first and second shear blades passing in shearing relationship, a first workpiece receiving recess in the side face surface of said first shear blade, a second workpiece receiving recess in the side face surface of said second shear blade, said first and second recesses positioned to receive a workpiece aligned with said straight line paths and cooperating in said overlapped position to define a chamber having the form of a workpiece, and workpiece clamp means holding a workpiece longitudinally fixed in said recesses, whereby a workpiece with a flange may be positioned in said recesses with the flange positioned between the blades in said spaced positioned limit and the blades closed to said overlapped positioned limit to shear the flange but pass over the remaining surface of the workpiece.

12. A workpiece surface trimming device for trimming a projecting portion from the intermediate part of a workpiece which intermediate part defines a cutting area along the longitudinal axis of said workpiece comprising cutter elements arranged lengthwise of said axis at opposite sides of said cutting area and means providing a relative longitudinal movement of said workpiece and cutter elements along said axis to cause said cutter elements to trim said projecting part from said workpiece.

13. A workpiece surface trimming device for trimming a projecting portion from the intermediate part of a workpiece which intermediate part defines a cutting area along the longitudinal axis of said workpiece comprising means for holding said workpiece against longitudinal movement along said axis at either side of said cutting area, and relatively movable cutter elements arranged at opposite sides of said cutting area and being movable in opposite directions along said axis to trim said projecting portion from said workpiece.

14. A workpiece surface trimming device for trimming projecting portions from a workpiece comprising a plurality of relatively movable cutter elements positioned relative to said workpiece, holding means to hold said workpiece from longitudinal movement relative to said cutter elements, and means for moving said cutter elements in opposite directions to trim said projecting portions from said workpiece.

15. A workpiece surface trimming device for trimming projecting portions from a workpiece comprising a plurality of relatively movable cutter elements positioned relative to said workpiece, holding means to hold said workpiece from longitudinal movement relative to said cutter elements, means for moving said cutter elements in opposite directions to trim said projecting portions from said workpiece, and said holding means operating to tighten its grip upon said workpiece as said cutter elements operate to trim said projecting portions from said workpiece.

16. In apparatus for trimming a projecting portion from an intermediate part of a workpiece comprising relatively movable first and second cutter blades having workpiece receiving recesses defining a workpath and having cutting edges initially spaced apart for the insertion of a workpiece transversely of said workpath between said spaced apart blades and for the switching of the relative position of said workpiece and blades to dispose said workpiece in said workpiece receiving recesses with the projecting portion arranged in the space between the cutting edges of said blades, holding means to hold the workpiece in said position, and said holding means and blades being relatively movable lengthwise of said workpiece to cause said blades to remove said projecting portion therefrom.

References Cited in the file of this patent

UNITED STATES PATENTS

| | | |
|---|---|---|
| 166,337 | Brown | Aug. 3, 1875 |
| 427,497 | Bernard | May 6, 1890 |
| 1,475,273 | Bernard | Nov. 27, 1923 |
| 1,958,147 | Kelley et al. | May 8, 1934 |
| 2,011,725 | Morton | Aug. 20, 1935 |